US008432942B1

(12) United States Patent
Algie et al.

(10) Patent No.: US 8,432,942 B1
(45) Date of Patent: Apr. 30, 2013

(54) PROVIDING A TIMING SOURCE FOR MULTIPLE NODES COUPLED TO A CIRCUIT-SWITCHED NETWORK

(75) Inventors: Glenn G. Algie, Ottawa (CA); Eric C. Valk, Nepean (CA); Craig D. Suitor, Nepean (CA)

(73) Assignee: Apple Inc., Cupertino, CA (US)

( * ) Notice: Subject to any disclaimer, the term of this patent is extended or adjusted under 35 U.S.C. 154(b) by 1956 days.

(21) Appl. No.: 10/748,392

(22) Filed: Dec. 30, 2003

Related U.S. Application Data

(60) Provisional application No. 60/471,140, filed on May 16, 2003.

(51) Int. Cl.
*H04J 3/06* (2006.01)
(52) U.S. Cl.
USPC .......................................... 370/516; 370/503
(58) Field of Classification Search .......... 370/503, 370/350, 217, 326, 458, 230, 252, 468, 215, 370/295, 392, 241, 235, 240, 249, 389, 465, 370/519, 351, 352, 354, 364, 432, 477, 498, 370/516, 510, 512; 455/422, 502, 507, 524, 455/561, 466, 503, 456.1, 456.2, 450, 422.1, 455/63.1, 296; 709/203, 223, 240, 218, 220, 709/229, 224; 398/45, 66, 58, 1, 70, 85, 398/67, 168, 5, 100; 725/111, 129, 127, 725/91, 105, 11; 713/400
See application file for complete search history.

(56) References Cited

U.S. PATENT DOCUMENTS

| | | | | |
|---|---|---|---|---|
| 5,309,483 A * | 5/1994 | Oliboni et al. | ................ | 375/355 |
| 5,566,180 A | 10/1996 | Eidson et al. | ................ | 370/94.2 |
| 5,953,658 A * | 9/1999 | Scott | ............................ | 455/422.1 |
| 6,078,632 A * | 6/2000 | Cesulka et al. | ................ | 375/368 |
| 6,252,445 B1 | 6/2001 | Eidson | ............................ | 327/172 |
| 6,278,710 B1 | 8/2001 | Eidson | ............................ | 370/394 |
| 6,323,803 B1 * | 11/2001 | Jolley et al. | .............. | 342/357.03 |
| 6,363,056 B1 * | 3/2002 | Beigi et al. | ..................... | 370/252 |
| 6,370,159 B1 | 4/2002 | Eidson | ............................ | 370/503 |
| 6,473,694 B1 * | 10/2002 | Akopian et al. | ............... | 701/213 |
| 6,490,727 B1 * | 12/2002 | Nazarathy et al. | ............. | 725/129 |
| 6,493,539 B1 | 12/2002 | Falco et al. | .................... | 455/67.1 |
| 6,512,990 B1 | 1/2003 | Woods et al. | .................. | 702/125 |
| 6,542,754 B1 * | 4/2003 | Sayers et al. | ................... | 455/502 |
| 6,697,382 B1 * | 2/2004 | Eatherton | ..................... | 370/503 |
| 6,698,022 B1 * | 2/2004 | Wu | ............................... | 725/111 |
| 6,791,995 B1 * | 9/2004 | Azenkot et al. | ............... | 370/436 |
| RE38,619 E * | 10/2004 | Paratore et al. | ............... | 370/347 |

(Continued)

OTHER PUBLICATIONS

The International Engineering Consortium, "Tektronix: Synchronous Optical Network Tutorial," printed from website http://www.webproforum.com, pp. 1-58 (1997).

*Primary Examiner* — Abdullah Riyami
(74) *Attorney, Agent, or Firm* — Meyertons, Hood, Kivlin, Kowert & Goetzel, P.C.

(57) ABSTRACT

A communications network includes multiple distributed nodes that are coupled by a circuit-switched network. To improve efficiency, a plurality of the nodes are associated with a single source synchronization block that injects timing messages over circuits in the circuit-switched network to the plurality of nodes. Each of the plurality of nodes is associated with a timing extraction and recovery block that extracts information from the timing messages injected by the source synchronization block to synchronize a local clock in each node to the frequency and phase of a clock received by the source synchronization block.

21 Claims, 3 Drawing Sheets

U.S. PATENT DOCUMENTS

| | | | |
|---|---|---|---|
| 6,829,717 B1* | 12/2004 | Roust | 713/502 |
| 6,963,541 B1* | 11/2005 | Vogel et al. | 370/252 |
| 7,006,446 B1* | 2/2006 | Anderson | 370/248 |
| 7,047,011 B1* | 5/2006 | Wikman | 455/442 |
| 7,050,419 B2* | 5/2006 | Azenkot et al. | 370/347 |
| 7,054,308 B1* | 5/2006 | Conway | 370/356 |
| 7,068,712 B1* | 6/2006 | Zang et al. | 375/222 |
| 7,088,678 B1* | 8/2006 | Freed et al. | 370/230 |
| 7,142,544 B2* | 11/2006 | Kim et al. | 370/395.1 |
| 7,167,713 B2* | 1/2007 | Anderson | 455/456.1 |
| 7,224,984 B2* | 5/2007 | Agrawala et al. | 455/456.1 |
| 7,298,762 B2* | 11/2007 | Rakib | 370/468 |
| 7,483,450 B1 | 1/2009 | Giese | |
| 7,603,033 B1* | 10/2009 | Lumetta et al. | 398/5 |
| 7,668,968 B1* | 2/2010 | Smith | 709/234 |
| 7,768,993 B2 | 8/2010 | Giese | |
| 2001/0022823 A1* | 9/2001 | Renaud | 375/359 |
| 2001/0033611 A1* | 10/2001 | Grimwood et al. | 375/219 |
| 2001/0040902 A1* | 11/2001 | Rao | 370/519 |
| 2001/0043622 A1* | 11/2001 | Bernath et al. | 370/516 |
| 2002/0055999 A1* | 5/2002 | Takeda | 709/224 |
| 2002/0061012 A1* | 5/2002 | Thi et al. | 370/352 |
| 2002/0109876 A1* | 8/2002 | Eijk et al. | 359/110 |
| 2002/0129290 A1* | 9/2002 | Couillard | 713/400 |
| 2002/0131441 A1* | 9/2002 | Trachewsky et al. | 370/441 |
| 2002/0154620 A1* | 10/2002 | Azenkot et al. | 370/347 |
| 2002/0163932 A1* | 11/2002 | Fischer et al. | 370/465 |
| 2002/0171895 A1* | 11/2002 | Chang | 359/168 |
| 2003/0013146 A1* | 1/2003 | Werb | 435/9 |
| 2003/0026223 A1* | 2/2003 | Eriksson et al. | 370/335 |
| 2003/0035504 A1* | 2/2003 | Wong et al. | 375/377 |
| 2003/0043744 A1* | 3/2003 | Lu et al. | 370/236 |
| 2003/0206559 A1* | 11/2003 | Trachewsky et al. | 370/509 |
| 2004/0049565 A1* | 3/2004 | Keller et al. | 709/223 |
| 2004/0095963 A1* | 5/2004 | Rakib | 370/503 |
| 2004/0190544 A1* | 9/2004 | Azenko et al. | 370/442 |
| 2004/0203993 A1* | 10/2004 | Tanoue | 455/522 |
| 2004/0208563 A1* | 10/2004 | Roberts et al. | 398/70 |
| 2004/0246891 A1* | 12/2004 | Kay et al. | 370/215 |
| 2005/0018611 A1* | 1/2005 | Chan et al. | 370/241 |
| 2005/0186933 A1* | 8/2005 | Trans | 455/296 |
| 2005/0277424 A1* | 12/2005 | McKenna et al. | 455/450 |
| 2006/0088056 A1* | 4/2006 | Quigley et al. | 370/468 |
| 2006/0267841 A1* | 11/2006 | Lee et al. | 342/463 |
| 2006/0268887 A1* | 11/2006 | Lu et al. | 370/394 |
| 2007/0036176 A1* | 2/2007 | Quigley et al. | 370/468 |
| 2007/0109995 A1* | 5/2007 | Quigley et al. | 370/329 |
| 2007/0140393 A1* | 6/2007 | Kolze | 375/354 |
| 2008/0130685 A1* | 6/2008 | Rogerson et al. | 370/478 |
| 2010/0067545 A1* | 3/2010 | Hata et al. | 370/465 |

* cited by examiner

PROVIDING A TIMING SOURCE FOR MULTIPLE NODES COUPLED TO A CIRCUIT-SWITCHED NETWORK

CROSS REFERENCE TO RELATED APPLICATION

This claims the benefit under 35 U.S.C. 119(e) of U.S. Provisional Application Ser. No. 60/471,140, entitled "Providing a Timing Source for Multiple Nodes Coupled to a Circuit-Switched Network," filed May 16, 2003.

TECHNICAL FIELD

The invention relates generally to providing a timing source to multiple nodes coupled to a circuit-switched network.

BACKGROUND

Modern telecommunications networks are capable of offering various types of services at ever greater bandwidths and speeds. Examples of services include both circuit-switched services (e.g., voice-based telephony sessions) and packet-switched services (e.g., electronic mail, web browsing, electronic gaming, packet-switched voice communications, and so forth).

There are two types of networks, circuit-switched networks and packet-switched networks. In a circuit-switched network, a circuit is allocated to each communications session (such as a voice-based call session) between endpoints. This circuit is occupied for the duration of the communications session between the endpoints. For example, in a circuit-switched network that employs time-division multiplexing, an allocated circuit may include a time slot from a group of multiple time slots. The allocated circuit is not released until the communications session is terminated, which means the circuit is unavailable for other sessions.

In contrast, the resources of a packet-switched network can be shared by multiple communications sessions, with bandwidth on the packet-switched network provided on an as-needed basis. In other words, even though a communications session may be active between two endpoints, network resources are not allocated to the session if there are no packets to send, which means that the network resources are available for other sessions. In packet-switched communications, packets carrying address information are transmitted, with the address information in the packets used to route the packets from a source to a destination.

Although there has been a high proliferation of packet-switched networks, with the Internet being a well known example, circuit-switched networks still have many applications. For example, in addition to circuit-switched networks used in public switched telephone networks (PSTNs), circuit-switched links are also used to interconnect nodes of a mobile or wireless communications network. A mobile communications network is made up a plurality of cells, with each cell containing a radio communications center in which a mobile station can establish a call with another endpoint. Each cell typically includes a base transceiver system (BTS), which includes a radio frequency (RF) transceiver to communicate radio signals with mobile stations within a cell. The BTSs are coupled by links to a base station controller (BSC). Multiple BSCs can in turn be coupled to a mobile switching center (MSC). In alternative arrangements, base stations at corresponding cell sites are coupled directly to the MSC, instead of through BSCs.

Examples of circuit-switched links include T-carrier links (e.g., T1 or DS1, T2 or DS2, T3 or DS3, etc.). In Europe and Japan, variations of the T-carrier concept include E-carrier links (e.g., E1, etc.) and J-carrier links (e.g., J1, etc.). A T-carrier link employs time division multiplexing (TDM) to derive multiple channels from a physical wire-based circuit. In some cases, instead of electrical wires, T-carrier links are carried over an optical transport to further enhance bandwidth between the various nodes of a mobile communications network.

Circuit-switched networks also have numerous other applications, such as to link user terminals by local exchange devices, e.g., key telephone systems, private branch exchange (PBXs), automatic call distributors (ACDs), and so forth.

In many telecommunication networks, synchronous operation is a technique used to achieve high performance. In some cases, precise synchronization of nodes within a distributed network is employed to achieve high performance. For example, in some mobile communications networks, global positioning system (GPS) receivers are provided in each BTS to achieve synchronization among the BTSs. Because there usually are a large number of BTSs in a mobile communications network, providing a GPS receiver in each BTS can be quite costly to implement.

SUMMARY

In general, methods and apparatus are provided to synchronize local clocks of various nodes to a remote timing source, with the nodes coupled by a circuit-switched network. For example, a method for use in a communications network having a timing source, a circuit-switched link, and a node includes receiving, at the node, a message over the circuit-switched link, with the message containing a timestamp derived from the timing source. The timestamp is extracted from the message, and a local clock of the node is synchronized to the extracted timestamp.

Some embodiments of the invention may have one or more of the following benefits. Optimization of a communications network having multiple distributed nodes coupled by a circuit-switched network is achieved by associating the nodes with a single (or a few) source synchronization block(s). The synchronization block is operable to inject timing messages over circuits in the circuit-switched network. Each node is associated with a timing extraction and recovery block that extracts information from the timing messages injected by the source synchronization block to synchronize a local clock in each node to the frequency and phase of a clock received by the source synchronization block. By employing this arrangement, a reduced number of precision timing sources can be employed (as compared to conventional arrangements). The reduced number of precision timing sources results in reduced cost in the implementation of the communications network.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
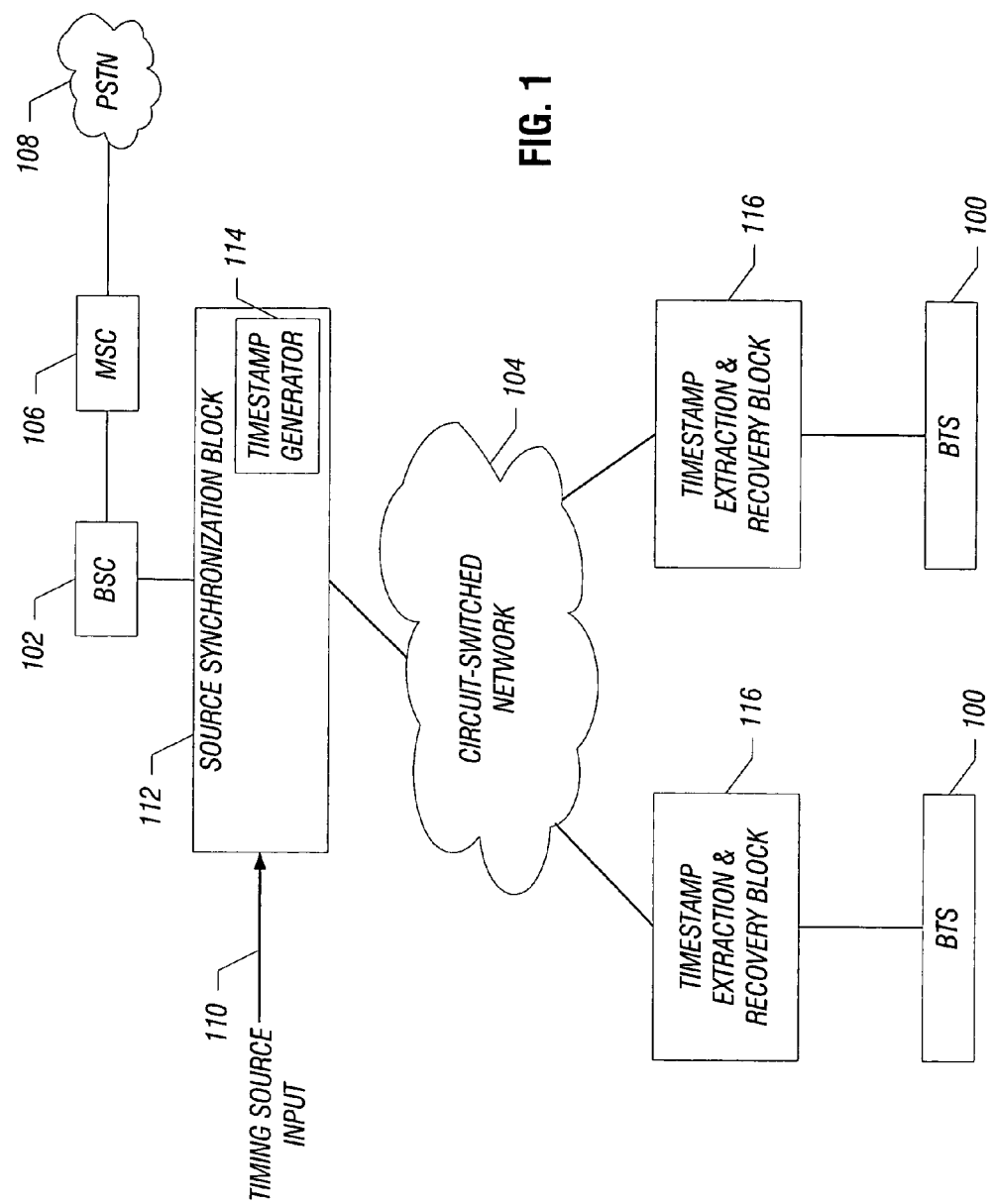
FIG. 1 is a block diagram of an example communications network that employs an embodiment of the invention.

FIG. 1 illustrates an example communications network in which an embodiment of the invention is implemented. The example shown in FIG. 1 is a wireless or mobile communications network, which includes base station transceivers (BTSs) 100 that perform wireless communications with mobile stations in respective cells of the mobile communications network. The BTSs 100 are coupled to a base station controller (BSC) 102 through a network 104. In a typical mobile communications network, multiple BSCs 102 are provided, with each BSC coupled to respective plural BTSs 100. The BSCs are in turn coupled to a mobile switching center (MSC) 106, which is coupled to a public switched telephone network 108.

The wireless communications network shown in FIG. 1 is an example of a code-division multiple access (CDMA) network. In other arrangements, other types of wireless communications networks can be used, such as those based on time division multiple access (TDMA) technologies.

In conventional wireless communications networks, each BTS 100 often requires a timing source to synchronize the multiple BTSs 100 with respect to each other. To achieve relatively precise synchronization among the BTSs, precision timing sources (such as Stratum-1 timing sources) are used. Stratum-1 timing sources are categorized as the most precise timing sources. An example of a Stratum-1 timing source is a GPS (global positioning system) timing source. To receive the precision timing information from the GPS source, each BTS 100 in a conventional wireless communications network includes a GPS receiver. Because there can be a large number of BTSs 100, providing a GPS receiver in each BTS 100 can be rather expensive.

Therefore, in accordance with some embodiments of the invention, instead of providing a precision timing source (such as a GPS receiver) at each BTS 100, a group of BTSs 100 is assigned to a common precision timing source, such as a GPS timing source. For example, in the arrangement of FIG. 1, all BTSs 100 that are associated with the BSC 102 have one precision timing source provided at a timing source input 110 to a source synchronization block 112. The source synchronization block 102 includes a timestamp generator 114 that receives the timing source input 110 and generates timestamp data from the timing source input 110. The timestamp data is inserted into timing messages that are transmitted to the BTSs by the source synchronization block 112.

If there are multiple BSCs 102, then multiple source synchronization blocks 112 may be associated with the BSCs 102. Alternatively, one precision timing source can be provided for the entire wireless communications network. In one arrangement, the synchronization block 112 is provided as part of the BSC 102. Alternatively, the synchronization block 112 is separate from the BSC 102. In yet other arrangements, the source synchronization block 112 can be provided elsewhere in the network. Also, redundant source synchronization blocks can be provided for fault tolerance so that synchronization of the BTSs can still be achieved even if one source synchronization block fails.

Although some embodiments of the invention are described in the context of the wireless communications network shown in FIG. 1, it should be understood that the synchronization mechanism can be applied to other circuit-switched networks that couple a source synchronization block to multiple nodes, with the multiple nodes receiving the timing messages from the source synchronization block for the purpose of synchronization.

As noted above, a GPS timing source is an example of a Stratum-1 timing source. Other types of Stratum-1 timing sources also exist. A GPS timing source provides a timestamp in the form of a UTC (universal timing code). Alternatively, instead of a timing source that provides timestamps, a frequency reference source clock can also be used, with the timing source input 110 receiving the output of the frequency reference source clock. The timestamp generator 114 generates timestamps from the frequency reference received at the input 110. Although reference is made to the Stratum-1 timing sources in this discussion, it is noted that other embodiments can employ other timing sources, such as Stratum-2 or Stratum-3 timing sources, which are less accurate than a Stratum-1 timing source.

The timestamps generated by the timestamp generator 114 are inserted into timing messages, which are precision injected into the network 104 (made up of circuit-switched links) for communication to timestamp extraction and recovery blocks 116 associated with respective BTSs 100. Each timestamp extraction and recovery block 116 extracts timestamps from received timing messages. The timestamp extraction and recovery blocks 112 can be part of, or separate from, their respective BTSs 100. An internal clock associated with each BTS 100 is synchronized (both frequency and phase synchronized) by the timestamp extraction and recovery block 116 to the precision timing source.

Precision injecting a timing message refers to transmitting the timing message from the physical layer of the source synchronization block at precisely the time that a timestamp (including the time data derived from the timing source) is inserted into the timing message.

Examples of the circuit-switched links in the network 104 include T-carrier links, such as T1 (DS1), T2 (DS2), T3 (DS3), and so forth. Other similar links include E-carrier links and J-carrier links. More generally, the term "T-carrier link" or "T-carrier circuit" refers to any of T-carrier, E-carrier, and J-carrier links or circuits.

In accordance with some embodiments of the invention, timing packets are transmitted over the facility data link (FDL) of a T-carrier circuit, which is a channel that is reserved for communicating overhead and maintenance messages between equipment coupled to the circuit. The timing packets sent in the FDL are received by the timestamp extraction and recovery blocks 116.

The T-carrier circuits can be carried over traditional wire circuits, such as four-wire circuits. Alternatively, the T-carrier circuits can be provided over an optical transport, such as a SONET/SDH (Synchronous Optical Network/Synchronous Digital Hierarchy) transport. SONET/SDH is a set of international standards for broadband communications over optical transmission systems. SONET/SDH describes the characteristics of a fiber optical physical infrastructure for carrying signals of different capacities through a synchronous, optical hierarchy. The base signal defined by SONET is the Synchronous Transport Signal level-1 (STS-1), which is capable of transmitting up to 28 DS1 frames or one DS3 frame, as an example. An STS-1 electrical signal is converted to an optical signal (referred to as Optical Carrier-N, or OC-N) for transport over a fiber optic medium. An STS-1 payload can be subdivided into multiple virtual tributaries (VTs) for transporting lower speed transmissions.

Note that in other embodiments, other types of physical infrastructures can be used to transport circuit-switched information (control information and user data) between nodes coupled to the network 104.

There are often multiple circuits between the BSC 102 and each BTS 100. At least one circuit between the BSC 102 and the BTS 100 is retimed so that the offset (or phase) delay between the BSC 102 and the BTS 100 is known and can be compensated for in the transmission of timing messages. For example, if there are four T1 circuits between the BSC 102 and each BTS 100, then at least one of the four T1 circuits is retimed. The retiming function allows a high level of precision when injecting and extracting timestamp or ranging messages. The phase offset calculation is performed in a ranging procedure, during a setup phase, with either the source synchronization block 112 or a timestamp extractor and recovery block 116 storing the phase offset information pertaining to the circuit between the BSC 102 and a given BTS 100. After the setup phase, timing packets are periodically injected over each retimed circuit to maintain synchronization between a local clock generator 200 (FIG. 2) at the BTS 100 and the precision timing source coupled to the source synchronization block 112.

Figure 2:
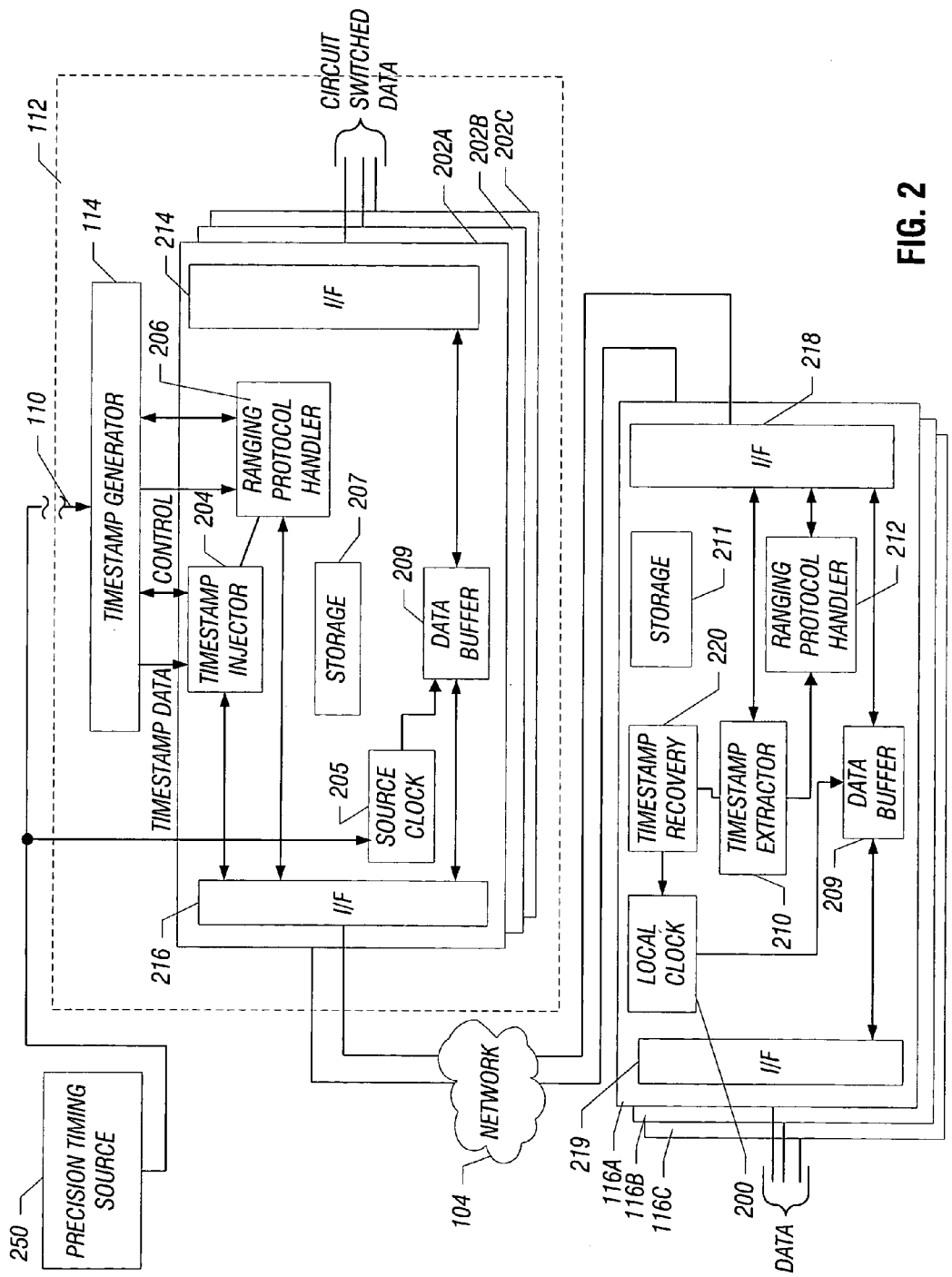
FIG. 2 is a block diagram of an arrangement to provide synchronization at multiple points within the communications network, according to an embodiment of the invention.

As shown in the example implementation of FIG. 2, the source synchronization block 112 includes multiple sub-blocks 202A, 202B, and so forth, for performing the synchronization procedure according to some embodiments. Each sub-block 202 is associated with a corresponding timestamp extraction and recovery block 116. Each of the sub-blocks 202 includes a timestamp injector 204, a ranging protocol handler 206, and circuit retimer blocks 205 and 209 (block 205 is a source clock generator and block 209 is a retiming data buffer). The ranging protocol handler 206 creates ranging messages in the ranging procedure, with the ranging messages sent to each BTS for the purpose of calculating phase offset information over a respective circuit. Phase offset information is communicated from the ranging protocol handler 206 to the timestamp injector 204 to enable compensation for the phase offset at the source (the BSC 112).

The timestamp injector 204 inserts timestamps into timing messages that are periodically delivered (e.g., 1-10 timing messages per second) over a circuit to a respective BTS 100. The precision retimer function is performed by the retiming data buffer 209 using an elastic data buffering mechanism. The retimer function also uses the precision source clock generator 205, which is synchronized with respect to a precision timing source 250. In one example embodiment, the sub-blocks 202A, 202B, and so forth, are implemented with multiple circuits or multiple hardware processing devices that are connected to a platform on which the BSC 102 is implemented.

At the BTS location, multiple timestamp extraction and recovery blocks 116A, 116B, and so forth, correspond to respective BTSs 100. Each of the blocks 116 includes a timestamp extractor 210, timestamp recovery logic 220, a local clock generator 200, and a ranging protocol handler 212. The timestamp extractor 210 extracts timestamps from messages transmitted from either the ranging protocol handler 206 or the timestamp injector 204. The ranging protocol handler 212 calculates the ranging procedure phase offset of the time-stamped flow in the respective circuit between the BTS 100 and the BSC 102. The timestamp recovery logic 220 performs a recovery algorithm to recover frequency and phase information so that the local clock generator 200 is synchronized (locked in both frequency and phase) to the precision timing source based on the periodically received timing messages. As shown in FIG. 2, the timestamp extraction and recovery block 116A at a BTS 100 is coupled to sub-block 202A at the BSC 102; the block 116B is coupled to the sub-block 202B; and so forth.

The timestamp generator 114 at the BSC 102 receives the output of a precision timing source 250 over the input 110. In one example, the timestamp generator 114 includes a GPS receiver for receiving GPS timing data (originated by the timing source 250). The output of the timestamp generator 114 is coupled to the timestamp injector 204 and ranging protocol handler 206. As discussed above, the precision timing source 250 in some cases is capable of generating timestamps. One example of such a precision timing source is a GPS timing source. However, even though the GPS timing source is able to generate timestamps, it may not generate timestamps at the frequency desired. In that case, the timestamp generator 114 derives additional timestamp values based on timestamps received from the precision timing source, with the derived timestamps inserted into timing messages to inject into respective circuits to BTSs 100.

In other cases, the precision timing source 250 does not generate timestamps. Instead, such a precision timing source simply provides a frequency reference (e.g., an oscillating signal that operates at a precise frequency) to blocks 204, 205, and 206. In this case, the timestamp generator 114 generates timestamps from the frequency reference, and provides the timestamps to the timestamp injector 204 and the ranging protocol handler 206. As yet another alternative, the timestamp injector 204 can be omitted—instead, each BTS can derive a frequency reference from the retimed data flow generated by the retiming data buffer 209. In this case, the ranging protocol handler 206 takes on the source timestamp distribution task via the ranging message.

As further shown in FIG. 2, each of the sub-blocks 202 includes an interface 214 to receive circuit-switched data (e.g., voice data or other data). For example, the circuit-switched data may be provided by the MSC 106. The type of the interface 214 is dependent on the type of link between the BSC 102 and MSC 106. For example, the interface 214 may include appropriate layers to communicate messages over T-carrier circuits. Also included in each sub-block 202 is another interface 216 that is coupled to the network 104. As noted above, the network 104 may be implemented with one of several different transport infrastructures, including electrical wires, optical links, and so forth. The interface 216 includes the appropriate protocol layers to interface with the physical infrastructure of the network 104.

As an example, the interface 216 includes a T1 framer to multiplex data into successive frames for transmission over a T1 circuit. If the underlying transport infrastructure of the network 104 is implemented with a SONET/SDH optical transport, then the interface 216 further includes appropriate modules to insert the T1 frame into the payload of an STS-1 frame or a VT frame.

As noted above, according to one embodiment, timing messages and ranging messages are transmitted over the facility data link (FDL) of a T-carrier circuit. In alternative embodiments, the timing messages and ranging messages can be carried in SONET/SDH overhead bytes or directly in line with the circuit data path flow through the data buffer 209.

The sub-block 202 also includes the retiming data buffer 209 that elastically buffers data to be transmitted between the interface 214 and the interface 216. The retiming data buffer 209 is precision clocked by the source clock generator 205 and may also receive a clock from interface 214. As noted above, the retiming data buffer 209 employs an elastic data buffering mechanism. An elastic buffering mechanism is used to buffer data between two data streams that are not phase synchronous. A FIFO (first in first out) buffer (in this case the data buffer 209) is interposed between the two data streams (stream at interface 214 and stream at interface 216) such that no data is lost as long as the mean data rate and jitter of the two data streams remain within certain limits.

At the BTS 100, each block 116 includes an interface 218 to communicate with the network 104. The interface 218 includes appropriate module(s) to extract messages from STS-1 or VT frames and T1 frames, as examples. Also, the block 116 includes another interface 219 that provides circuit-switched data to the BTS 100.

The timestamp extractor and recovery block 116 also includes a data buffer 213 to buffer data between the interfaces 218 and 219. The data buffer 213 is clocked by the local clock generator 200. In one example embodiment, each timestamp extraction and recovery block 116 can be implemented as a card inserted into a platform on which a corresponding BTS is implemented.

Because of the precision required for synchronization of the local clock at the BTS 100 to the precision timing source located some distance away, the precision injector 204, the ranging protocol handler 206, the timestamp extractor 210, the timestamp recovery logic 220, and the ranging protocol handler 212 are implemented in hardware, such as application-specific integrated circuits (ASICs), programmable gate arrays (PGAs), and the like. However, in other cases, the tasks performed by the logical elements may be provided by software executable on microprocessors or microcontrollers.

Figure 3:
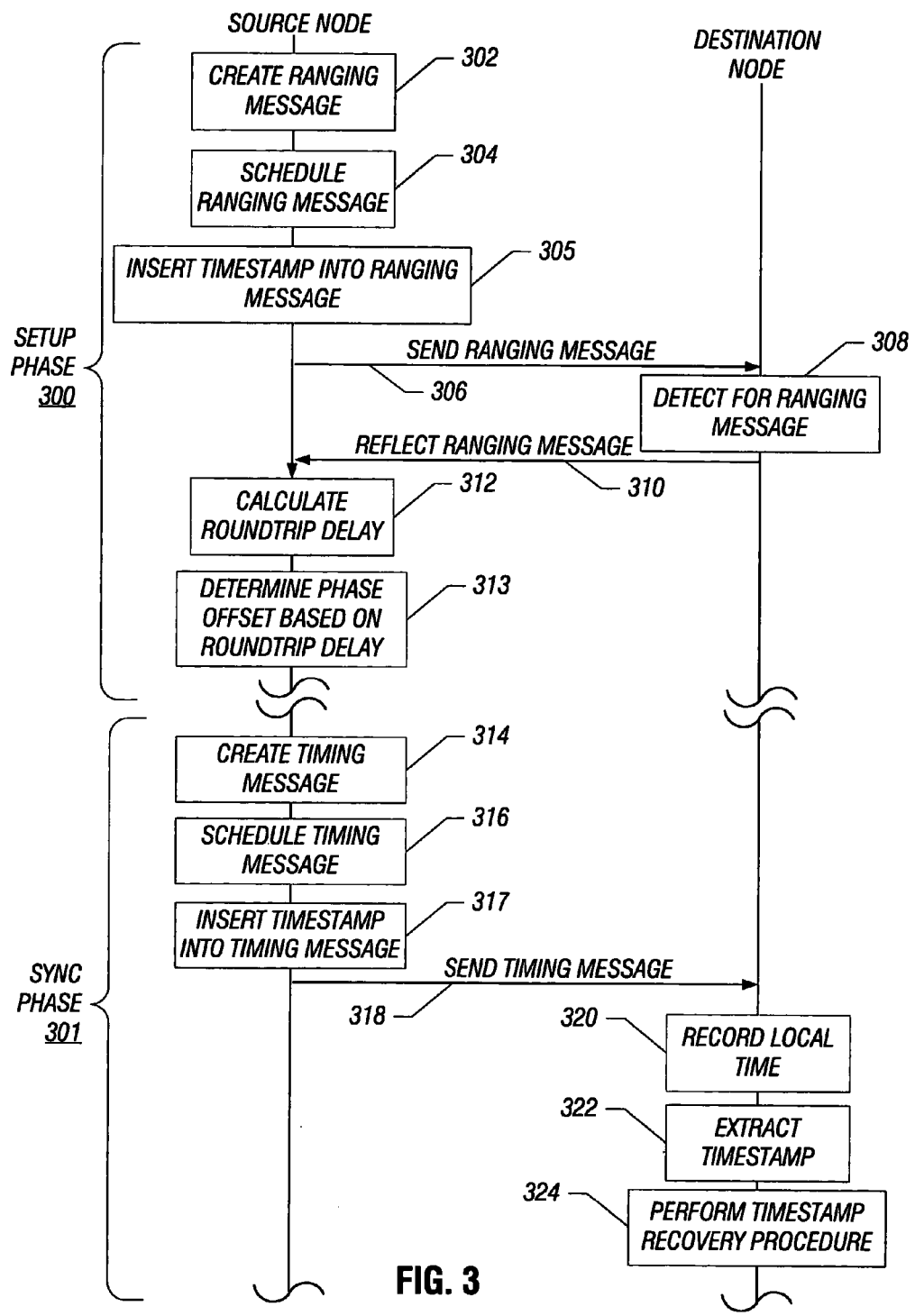
FIG. 3 is a message flow diagram of a synchronization process performed by nodes within the communications network.

FIG. 3 shows a synchronization procedure performed by the various elements of a circuit-switched communications network in accordance with an embodiment. FIG. 3 shows two parts, a setup phase 300 in which a circuit between the source node (e.g., BSC) and a destination node (e.g., BTS) is retimed; and a synchronization phase 301 to synchronize the local clocks at the BTSs to the precision timing source 250. In the setup phase 300, each source synchronization sub-block 202 (FIG. 2) communicates with a respective timestamp extraction and recovery block 116 for the purpose of retiming at least one circuit between the source node and the destination node. To start the ranging procedure, the ranging protocol handler 206 creates (at 302) a ranging message. The ranging message is scheduled (at 304) for transmission over the network 104. For example, if the ranging message is sent over the FDL of a T1 circuit, other maintenance or overhead messages may also be waiting for transmission over the FDL. In that case, priority is given to the ranging message so that it is sent ahead of certain other maintenance or overhead messages.

A timestamp provided by the timestamp generator 114 is then inserted (at 305) into the ranging message at the time the message is transmitted from the interface 216 of the source synchronization sub-block 202 in the network 104. The ranging message is sent (at 306) over the circuit that is to be retimed to the destination node. The ranging protocol handler 212 in the timestamp extraction and recovery block 116 detects (at 308) that the received message is a ranging message. This can be indicated in a header of a frame carrying the ranging message. The destination node then reflects (at 310) the ranging message back over the circuit to the source synchronization sub-block 202. The ranging protocol handler 206 receives the reflected ranging message and calculates the round-trip delay (at 310) of the ranging message's travel over the circuit between the source synchronization sub-block 202 and the timestamp extraction and recovery block 116. Next, the ranging protocol handler 206 determines (at 312) the phase offset based on the round-trip delay. This can be as simple as dividing the round-trip delay by two to obtain the phase offset. Alternatively, multiple ranging messages can be transmitted, with the round-trip delays associated with the multiple transmissions of ranging messages averaged in some way to compensate for any jitter that may be present in the circuit or in components of the sub-block 202 or block 116.

The calculated phase offset is stored in a storage 207 (FIG. 2) in the source synchronization sub-block 202. The phase offset is accessible by the timestamp injector 204 for later injections of timing messages during the synchronization phase.

Alternatively, a different ranging procedure can be performed in which the phase offset is calculated at the destination node (and stored by the destination node) instead of at the source node. In this latter case, compensation for the phase offset is performed at the destination node rather than at the source node.

During the synchronization phase 301, the timestamp injector 204 creates (at 314), on a periodic basis, timing messages for injection into a circuit to a respective destination node. The timing message is scheduled (at 316) for transmission over the circuit. Again, a priority scheme is used in which the timing message is transmitted ahead of other pending messages. At the time the timing message is being transmitted, a timestamp is inserted (at 317) by the timestamp injector 204 into the timing message. In one example, the timestamp inserted into the timing message is the current time less the phase offset value stored in the storage 207 (FIG. 2) calculated by the ranging procedure. Alternatively, if the phase offset is stored at the destination, the timestamp inserted into the timing message is the current time. In this latter option, the destination node substracts the phase offset from the timestamp in the received timing message.

The timing message is transmitted (at 318) over the circuit to the respective destination node. The periodicity at which the timing messages are transmitted is a value that is selected to achieve accuracy of synchronization while keeping the number timing messages relatively low to reduce consumption of bandwidth of the circuit between the source and destination nodes.

At the destination node, the timestamp extractor 210 detects if the received message is a timing message. If so, the local time is recorded (at 320) by the timestamp extractor 210 (or by another entity coupled to the timestamp extractor 210). Also, the timestamp extractor 210 extracts (at 322) the timestamp value from the timing message. Both the local time and extracted timestamp value are stored in a storage 211 (FIG. 2), which is accessible by the timestamp recovery logic 220. Once the extracted timestamp value and the recorded local time are stored in the storage 211, the timestamp extractor 210 notifies the timestamp recovery logic 220 to start the recovery procedure (at 324), in which the timestamp recovery logic 220 uses the recorded local time and the extracted timestamp value to synchronize (both frequency and phase) the local clock generated by the local generator 200 to the frequency and phase of the precision timing source.

By periodically receiving the timing messages, the timestamp extraction and recovery block 116 at a destination node is able to maintain synchronization with respect to the precision timing source, even though the precision timing source is located at a remote location.

As noted above, certain components of the source synchronization block 112 and timestamp extraction and recovery block 116 are implemented in hardware. However, in other implementations (if speed and jitter requirements can be achieved), the timestamp injector, ranging protocol handler, timestamp extractor, and timestamp recovery logic can be implemented in software executable on a microprocessor or microcontroller.

Instructions of such software can be stored on one or more storage devices and loaded for execution on corresponding microprocessors or microcontrollers. As used here, a "controller" refers to hardware, software, or a combination thereof. A "controller" can refer to a single component or to plural components (whether software or hardware).

Data and instructions (of software) are stored in respective machine-readable storage media. The storage media include different forms of memory, including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software can be loaded or transported to a device in one of many different ways. For example, code segments including instructions stored on floppy disks, CD or DVD media, a hard disk, or transported through a network interface card, modem, or other interface device are loaded into the device and executed. In the loading or transport process, data signals that are embodied in carrier waves (transmitted over telephone lines, network lines, wireless links, cables, and the like) communicate the code segments, including instructions, to the device. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a communications network having a timing source, a circuit-switched link, a first node, and a source node, the method comprising:
    during a setup phase:
        receiving, at the first node, a first message from the source node over the circuit-switched link;
        reflecting the first message back to the source node over the circuit-switched link to enable the source node to determine an offset delay of the circuit-switched link; and
    during a synchronization phase:
        receiving, at the first node, a second message over the circuit-switched link, the second message containing a timestamp derived from the timing source that is associated with the source node, wherein the timestamp contained in the second message is dependent upon a current time of the timing source and the offset delay of the circuit-switched link;
        extracting the timestamp from the second message; and
        synchronizing a local clock of the first node to the extracted timestamp, wherein the synchronizing compensates for the offset delay of the circuit-switched link.

2. The method of claim 1, wherein receiving the second message containing the timestamp comprises receiving the timestamp derived from a Stratum 1 timing source.

3. The method of claim 1, further comprising recording a local time at a time the second message is received, wherein synchronizing the local clock is based on the extracted timestamp and the recorded local time.

4. The method of claim 1, wherein synchronizing the local clock comprises synchronizing a frequency and phase of the local clock to the timing source.

5. The method of claim 1, wherein receiving the second message over the circuit-switched link comprises receiving the second message over a facility data link of a T-carrier circuit.

6. The method of claim 1, wherein receiving the second message over the circuit-switched link comprises receiving the second message in Sonet/SDH overhead bytes.

7. The method of claim 1, wherein receiving the second message over the circuit-switched link comprises receiving the second message in line with a data flow of the circuit-switched link.

8. The method of claim 1, wherein receiving the second message over the circuit-switched link comprises receiving the second message from a base station controller.

9. The method of claim 8, wherein receiving the second message at the first node comprises receiving the second message at a base transceiver system.

10. A system comprising:
    a timestamp generator configured to, as part of a first phase, receive data from a timing source and to provide a first timestamp based on the data;
    a module including hardware configured to, as part of the first phase:
        insert the first timestamp into a first message,
        transmit the first message containing the first timestamp over a circuit-switched link to a destination node;
        receive the first message that is reflected back from the destination node; and
        according to the received first message from the destination node, compute an offset delay of the circuit-switched link;
    the timestamp generator configured to, during a synchronization phase, receive further data from the timing source and to provide a second timestamp based on the further data; and
    the module configured to, during the synchronization phase:
        insert the second timestamp into a second message, wherein the second timestamp is dependent upon a current time of the timing source and the offset delay of the circuit-switched link; and
        transmit the second message containing the second timestamp over the circuit-switched link to the destination node to enable local clock synchronization at the destination node.

11. The system of claim 10, further comprising an interface to a T-carrier circuit, the circuit-switched link comprising the T-carrier circuit.

12. The system of claim 11, wherein the interface is configured to transmit the second message over a facility data link of the T-carrier circuit.

13. The system of claim 10, wherein the timing source is a Stratum-1 timing source.

14. A non-transitory computer-accessible storage medium having programming instructions stored therein that, in response to execution by a first node of a communications network, cause the first node to perform operations comprising:
    during a first phase:
        receiving, at the first node, a first message from a source node over a circuit-switched link;

reflecting the first message back to the source node over the circuit-switched link to enable the source node to determine an offset delay of the circuit-switched link; and during a synchronization phase:
receiving, at the first node, a second message over the circuit-switched link, the second message containing a timestamp derived from a timing source that is associated with the source node, wherein the timestamp contained in the second message is dependent upon a current time of the timing source and the offset delay of the circuit-switched link;

extracting the timestamp from the second message; and synchronizing a local clock of the first node to the extracted timestamp, wherein the synchronizing compensates for the offset delay of the circuit-switched link.

15. The non-transitory computer-accessible storage medium of claim 14, wherein receiving the second message containing the timestamp comprises receiving the timestamp derived from a Stratum 1 timing source.

16. The non-transitory computer-accessible storage medium of claim 14, wherein the instructions when executed cause the first node to record a local time at a time the second message is received, synchronizing the local clock is based on the extracted timestamp and the recorded local time.

17. The non-transitory computer-accessible storage medium of claim 14, wherein synchronizing the local clock comprises synchronizing a frequency and phase of the local clock to the timing source.

18. The non-transitory computer-accessible storage medium of claim 14, wherein receiving the second message over the circuit-switched link comprises receiving the second message over a T-carrier circuit.

19. The non-transitory computer-accessible storage medium of claim 18, wherein receiving the second message over the T-carrier circuit comprises receiving the second message over a facility data link of the T-carrier circuit.

20. The non-transitory computer-accessible storage medium of claim 14, wherein receiving the second message over the circuit-switched link comprises receiving the second message from a base station controller.

21. The non-transitory computer-accessible storage medium of claim 20, wherein receiving the second message at the first node comprises receiving the second message at a base transceiver system.

\* \* \* \* \*

UNITED STATES PATENT AND TRADEMARK OFFICE
CERTIFICATE OF CORRECTION

PATENT NO. : 8,432,942 B1
APPLICATION NO. : 10/748392
DATED : April 30, 2013
INVENTOR(S) : Glenn G. Algie et al.

Page 1 of 1

It is certified that error appears in the above-identified patent and that said Letters Patent is hereby corrected as shown below:

In the Claims:

Claim 16, Column 11, Line 25, please delete "received," and substitute -- received, and --

Signed and Sealed this
Twenty-fifth Day of June, 2013

Teresa Stanek Rea
*Acting Director of the United States Patent and Trademark Office*